US008639698B1

(12) United States Patent
Buryak (10) Patent No.: US 8,639,698 B1
(45) Date of Patent: Jan. 28, 2014

(54) MULTI-LANGUAGE DOCUMENT CLUSTERING

(75) Inventor: Kirill Buryak, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/549,624

(22) Filed: Jul. 16, 2012

(51) Int. Cl.
*G06F 17/30* (2006.01)

(52) U.S. Cl.
USPC ............................................................ 707/737

(58) Field of Classification Search
USPC ............................................................ 707/737
See application file for complete search history.

(56) References Cited

U.S. PATENT DOCUMENTS

| | | | |
|---|---|---|---|
| 5,956,711 A | 9/1999 | Sullivan et al. | |
| 6,006,221 A | 12/1999 | Liddy et al. | |
| 7,720,856 B2 | 5/2010 | Goedecke et al. | |
| 7,844,566 B2 | 11/2010 | Wnek | |
| 8,015,124 B2 | 9/2011 | Milo et al. | |
| 2002/0002452 A1 | 1/2002 | Christy et al. | |
| 2002/0156763 A1* | 10/2002 | Marchisio | 707/1 |
| 2005/0071152 A1 | 3/2005 | Morimoto et al. | |
| 2009/0193003 A1 | 7/2009 | Heymans et al. | |
| 2010/0036838 A1* | 2/2010 | Ellis | 707/5 |
| 2011/0106805 A1 | 5/2011 | Bao et al. | |

FOREIGN PATENT DOCUMENTS

| | | |
|---|---|---|
| JP | 2003076710 A | 3/2003 |
| KR | 20110116790 A | 10/2011 |
| WO | 2004059521 A | 7/2004 |
| WO | 2009154570 | 12/2009 |

OTHER PUBLICATIONS

Uszkoreit, J. et al., "Distributed Word Clustering for Large Scale Class-Based Language Modeling in Machine Translation," Proceedings of ACL-08: HLT, pp. 755-762, Columbus, OH, Jun. 2008.
PCT International Search Report and Written Opinion issued by the Korean Intellectual Property Office (ISA) on Oct. 28, 2013 for PCT International Application No. PCT/US2013/050018 (11 pages).

* cited by examiner

*Primary Examiner* — Pierre Vital
*Assistant Examiner* — Courtney Harmon
(74) *Attorney, Agent, or Firm* — Remarck Law Group PLC (57) ABSTRACT

A technique can include identifying a collection of documents to be clustered. The collection of documents can include foreign language documents and base language documents. The foreign language documents can be translated into the base language at a base language translation module. Keywords in the base language documents and keywords in the translated foreign language documents can be determined at a document indexing module. The base language documents can be clustered with the foreign language documents in a common set of document clusters based on the determined keywords in the base language documents and the determined keywords in the translated foreign language documents. In response to a search query in a first language, a listing of search results can be provided that includes documents in the first language and another language from the a common document cluster.

10 Claims, 6 Drawing Sheets

| Document 1 | Keyword 1 | Id1 |
|---|---|---|
| | Keyword 2 | Id2 |
| | Keyword 3 | Id3 |
| | Keyword 4 | Id4 |
| Document 2 | Keyword 1 | Id1 |
| | Keyword 2 | Id2 |
| | Keyword 3 | Id3 |
| | Keyword 4 | Id4 |
| . | . | . |
| . | . | . |
| . | . | . |
| Document n | Keyword 1 | Id2 |
| | Keyword 2 | Id3 |
| | Keyword 5 | Id5 |
| | Keyword 6 | Id6 |

MULTI-LANGUAGE DOCUMENT CLUSTERING

BACKGROUND

Document clusters may be used to enhance search queries. A collection of documents may be clustered based on common features. Documents within a cluster may be in a single language. For example, documents may be clustered for a single language as a result of keywords being used to form the document clusters. When a user enters a search query, the results provided will be related to a group of documents in only one language. As a result, documents relevant to the search, but in a different language, will not be provided to the user in response to the search query.

SUMMARY

In various embodiments of the present disclosure, a technique can include identifying, at a document collection module in a computing device, a collection of documents to be clustered. The collection of documents can include foreign language documents and base language documents. The foreign language documents can be machine translated into the base language at a base language translation module in the computing device. Keywords in the base language documents and keywords in the translated foreign language documents can be determined at a document indexing module in the computing device. A language-agnostic keyword index can be assigned to each of the determined keywords at the document indexing module. The base language documents can be clustered with the foreign language documents in a common set of document clusters based on the language-agnostic keyword indexes at a clustering module in the computing device. The set of document clusters can include both the base language documents and the foreign language documents and the set of document clusters can be stored in a database.

In various embodiments of the present disclosure, a technique can include identifying, at a document collection module in a computing device, a collection of documents to be clustered. The collection of documents can include foreign language documents and base language documents. The foreign language documents can be translated into the base language at a base language translation module in the computing device. Keywords in the base language documents and keywords in the translated foreign language documents can be determined at a document indexing module in the computing device. The base language documents can be clustered with the foreign language documents in a common set of document clusters based on the determined keywords in the base language documents and the determined keywords in the translated foreign language documents at a clustering module in the computing device. The set of document clusters can include both the base language documents and the foreign language documents and the set of document clusters can be stored in a database.

The technique can additionally include determining, at a duplicate document determination module in the computing device, when a first document in a first language in one of the document clusters corresponds to a translation of a second document in the one of the document clusters in a second language different than the first language and providing an indication when the first document corresponds to the translation of the second document at the computing device. The determining when the first document corresponds to a translation of the second document can include determining a distance between documents in the one of the document clusters and providing the indication when the distance between the first and second documents is within a predetermined threshold. The distance between the first and second documents can correspond to a level of similarity between the first and second documents.

Translating the foreign language documents into the base language can include machine translation of the foreign language documents into the base language. Alternatively, translating the foreign language documents into the base language can include sending the foreign language documents to a translation engine and receiving translations of the foreign language documents in the base language from the translation engine. The technique can additionally include applying a language-agnostic keyword index to the keywords. The language-agnostic keyword index can include a numerical keyword index. The clustering can occur after applying the language-agnostic keyword index to the keywords and the foreign language documents and the base language documents can be grouped within the set of document clusters based on the language-agnostic keyword index.

Identifying the collection of documents to be clustered can include accessing a product database from a closed system including an e-commerce product database. Each of the document clusters can include product information of related products in the product database in both the base language and at least one foreign language. The technique can additionally include temporarily storing the translated foreign language documents and deleting the translated foreign language documents after determining keywords in the translated foreign language documents.

In various embodiments of the present disclosure, a technique can include a document collection module, a base language translation module, a document indexing module, a clustering module and a database. The document collection module can identify a collection of documents from a network to be clustered including documents in multiple languages and can identify a base language. The base language translation module can be in communication with the document collection module and can identify a base language and can provide base language translations of foreign language documents from the collection of documents. The document indexing module can be in communication with the document collection module and the base language translation module and can determine keywords from base language documents within the collection of documents and the translations of the foreign language documents. The clustering module can be in communication with the document indexing module and can generate document clusters for the collection of documents based on the determined keywords from the document indexing module. The document clusters can include the base language documents and the foreign language documents from the collection of documents. The database can be in communication with the clustering module and can store the document clusters.

The technique can additionally include a duplicate document determination module in communication with the database that determines when a first document in a first language in one of the document clusters corresponds to a translation of a second document in a second language different than the first language and can provide an indication in the database when the first document corresponds to the translation of the second document. The duplicate document determination module can determine a distance between the first and second documents and can provide the indication when the distance between the first and second documents is within a predetermined threshold. The distance between the first and second documents can correspond to a level of similarity between the first and second documents.

The base language translation module can provide a machine translation of the foreign language documents into the base language. The document indexing module can provide a language-agnostic keyword index to each of the keywords. The clustering module can generate document clusters for the collection of documents based on the language-agnostic keyword indexes. The network can include a product database from a closed system forming an e-commerce product database. Each of the document clusters can include product information of related products in the product database in both the base language and at least one foreign language.

In various embodiments of the present disclosure, a technique can include receiving, at a communication module in a computing device, a request for a translation webpage from a user interacting with a user device in communication with the computing device. A search query can be received from the user in a first language at the communication module. At least one document in the first language related to the search query and at least one document cluster from a database in communication with the computing device can be identified at a document identification module in the computing device. The at least one document can include a first document requested for translation from the first language to a second language different from the first language by the user. The document cluster can include the first document in the first language and an additional document in the second language. The document cluster can be generated by: (i) identifying, at a document collection module in the computing device, a collection of documents to be clustered, the collection of documents including foreign language documents and base language documents, (ii) translating, at a base language translation module in the computing device, the foreign language documents into the base language to obtain translated foreign language documents, (iii) determining, at a document indexing module in the computing device, keywords in the base language documents and keywords in the translated foreign language documents, (iv) clustering, at a clustering module in the computing device, the base language documents with the foreign language documents in a common set of document clusters based on the determined keywords in the base language documents and the determined keywords in the translated foreign language documents, the set of document clusters including both the base language documents and the foreign language documents, and (v) storing the set of document clusters in a database. The at least one document cluster can be evaluated at a cluster evaluation module for a second document in the second language within a predetermined threshold from the first document, with a distance between the first and second documents corresponding to a level of similarity between the first and second documents. The second document can be provided to the user device via a user interface module in the computing device in response to the search query when the second document is within the predetermined threshold from the first document.

In various embodiments of the present disclosure, a technique can include receiving, at a communication module in a computing device, a search query in a first language from a user interacting with a user device in communication with the computing device. At least one document in the first language related to the search query and at least one document cluster from a database in communication with the computing device can be identified at a document identification module in the computing device. The document cluster can include the at least one document in the first language and an additional document in a second language different from the first language. A listing of search results can be provided to the user device from the computing device in response to the search query. The listing of search results can include documents in at least two languages including the first and second languages.

The search query can include a request for a translation webpage from the user and the at least one document can include a first document requested for translation from the first language to the second language by the user. The technique may additionally include evaluating the at least one document cluster for a second document in the second language within a predetermined threshold from the first document and providing the second document to the user in response to the search query when the second document is within the predetermined threshold from the first document. A distance between the first and second documents can correspond to a level of similarity between the first and second documents.

The document cluster can be generated by: (i) identifying, at a document collection module in the computing device, a collection of documents to be clustered, the collection of documents including foreign language documents and base language documents, (ii) translating, at a base language translation module in the computing device, the foreign language documents into the base language to obtain translated foreign language documents, (iii) determining, at a document indexing module in the computing device, keywords in the base language documents and keywords in the translated foreign language documents, (iv) clustering, at a clustering module in the computing device, the base language documents with the foreign language documents in a common set of document clusters based on the determined keywords in the base language documents and the determined keywords in the translated foreign language documents, the set of document clusters including both the base language documents and the foreign language documents, and (v) storing the set of document clusters in the database. The first language can be the base language used to generate the document clusters or can be a language corresponding to one of the foreign language documents.

Providing the listing of search results can include providing a list of results to the user device including documents in the first language and documents in at least the second language. Alternatively, the providing the listing of search results can include providing a list of results to the user device including documents in the first language and providing an option for the user to view related foreign language documents including documents in at least the second language.

The search query can include an identification of a first product on an e-commerce website. The at least one document can correspond to the first product and the at least one document cluster can include information for additional products related to the first product with the information being in a language different than the first language. Providing the listing of search results can include providing a listing of the additional products to the user device in response to the search query.

In various embodiments of the present disclosure, a technique can include a communication module, a document identification module and a user interface module. The communication module can receive a search query in a first language from a user interacting with a user device in communication with the computing device. The document identification module can be in communication with the communication module and can identify at least one document in the first language related to the search query and at least one document cluster from a database in communication with the computing device. The document cluster can include the at least one document in the first language and an additional document in a second language different from the first language. The user interface module can be in communication with the document identification module and can generate and provide a listing of search results to the user device. The listing of search results can include documents in at least two languages including the first and second languages.

The communication module can receive a request for a translation webpage from the user and the at least one document can include a first document requested for translation from the first language to the second language by the user. The technique can additionally include a cluster evaluation module in communication with the document identification module that evaluates the at least one document cluster for a second document in the second language within a predetermined threshold from the first document and provides the second document to the user in response to the search query when the second document is within the predetermined threshold from the first document. A distance between the first and second documents can correspond to a level of similarity between the first and second documents.

The technique can additionally include a document collection module, a base language translation module, a document indexing module and a clustering module. The at least one document cluster can be generated by: (i) identifying, at the document collection module, a collection of documents to be clustered, the collection of documents including foreign language documents and base language documents, (ii) translating, at the base language translation module, the foreign language documents into the base language, (iii) determining, at the document indexing module, keywords in the base language documents and keywords in the translated foreign language documents, (iv) clustering, at the clustering module, the base language documents with the foreign language documents in a common set of document clusters based on the determined keywords in the base language documents and the determined keywords in the translated foreign language documents, the set of document clusters including both the base language documents and the foreign language documents, and (v) storing the set of document clusters in the database.

The first language can be the base language used to generate the document clusters or can be a language corresponding to one of the foreign language documents. The listing of search results can include documents in the first language and documents in at least the second language. Alternatively, the listing of search results can include documents in the first language and an option for the user to view related foreign language documents including documents in at least the second language.

The search query can include an identification of a first product on an e-commerce website. The at least one document can correspond to the first product and the at least one document cluster can include information for additional products related to the first product with the information being in a second language different than the first language. The document identification module can provide a listing of the additional products to the user device in response to the search query.

These and other implementations may provide one or more of the following advantages. In some implementations, the techniques may provide enhanced search results, e.g., by returning documents in a language other than the language of the search query that are considered responsive to the query. In this manner, a document that is relevant to the search query, but that is in a language different from the language of the query, may be returned to a user.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
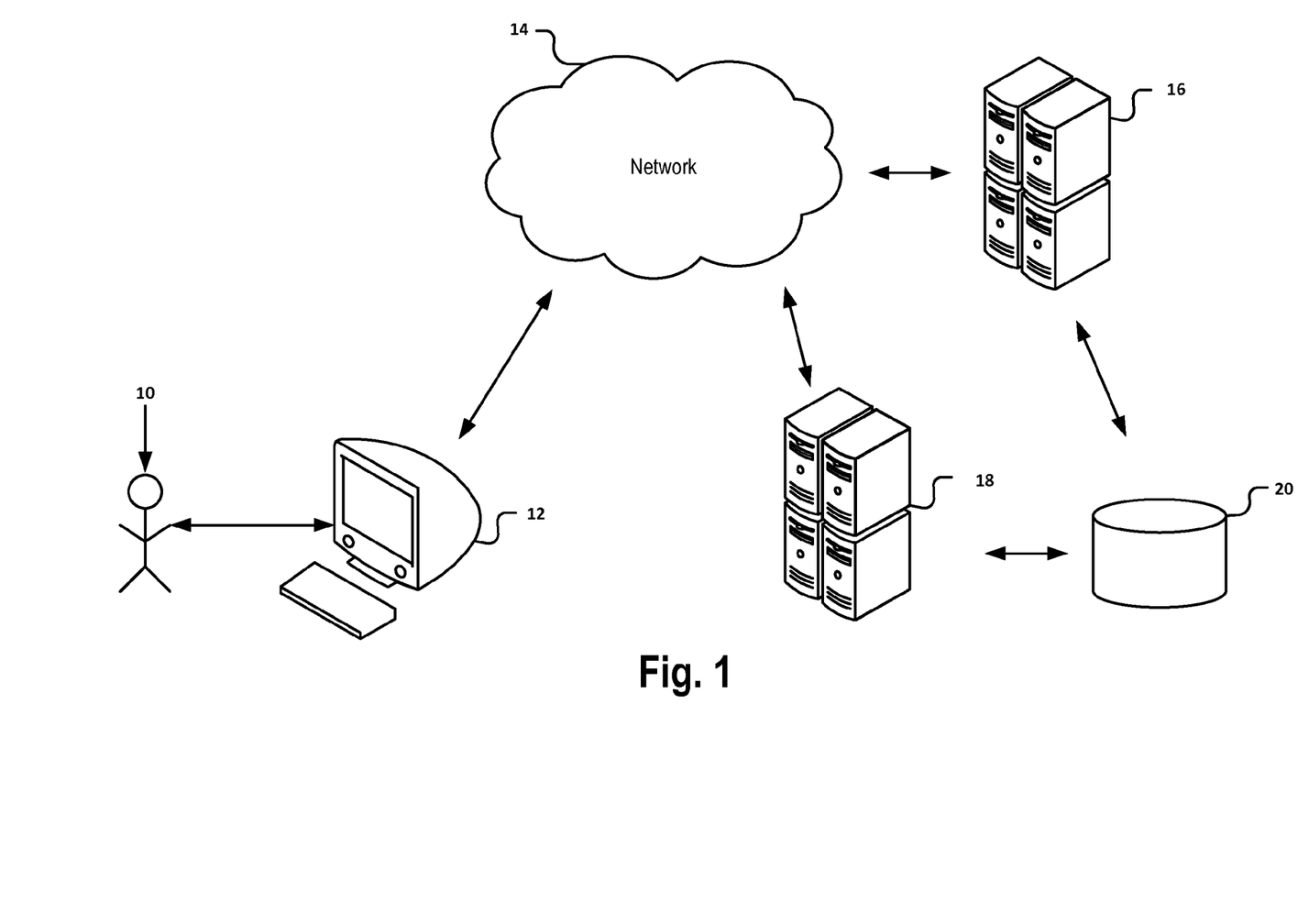
FIG. 1 is a schematic diagram of an example environment in which techniques of the present disclosure can be utilized.

Referring now to FIG. 1, an environment in which the techniques according to some embodiments of the present disclosure can be utilized is illustrated. A user 10 can interact with a user device 12, for example, to access a network 14. Examples of the network 14 include, but are not limited to, the Internet, a wide area network, a local area network, and a private network. A first computing device 16 and a second computing device 18 may be connected to the network 14 and may also be accessed by the user 10 via the user device 12. As used in the present disclosure, a computing device may include one or more computing devices, such as servers and/or processors. The first and second computing devices 16, 18 may include any combination of servers and/or processors common to or distinct from one another. The first and second computing devices 16, 18 may each be in communication with a database 20 to store and/or access a set of document clusters. One skilled in the art will appreciate that the environment shown in FIG. 1 is merely illustrative and different environments (such as those that include more or less components, those that include additional connections, and/or those that are arranged in a different configuration) may be utilized with the present disclosure.

Figure 2:
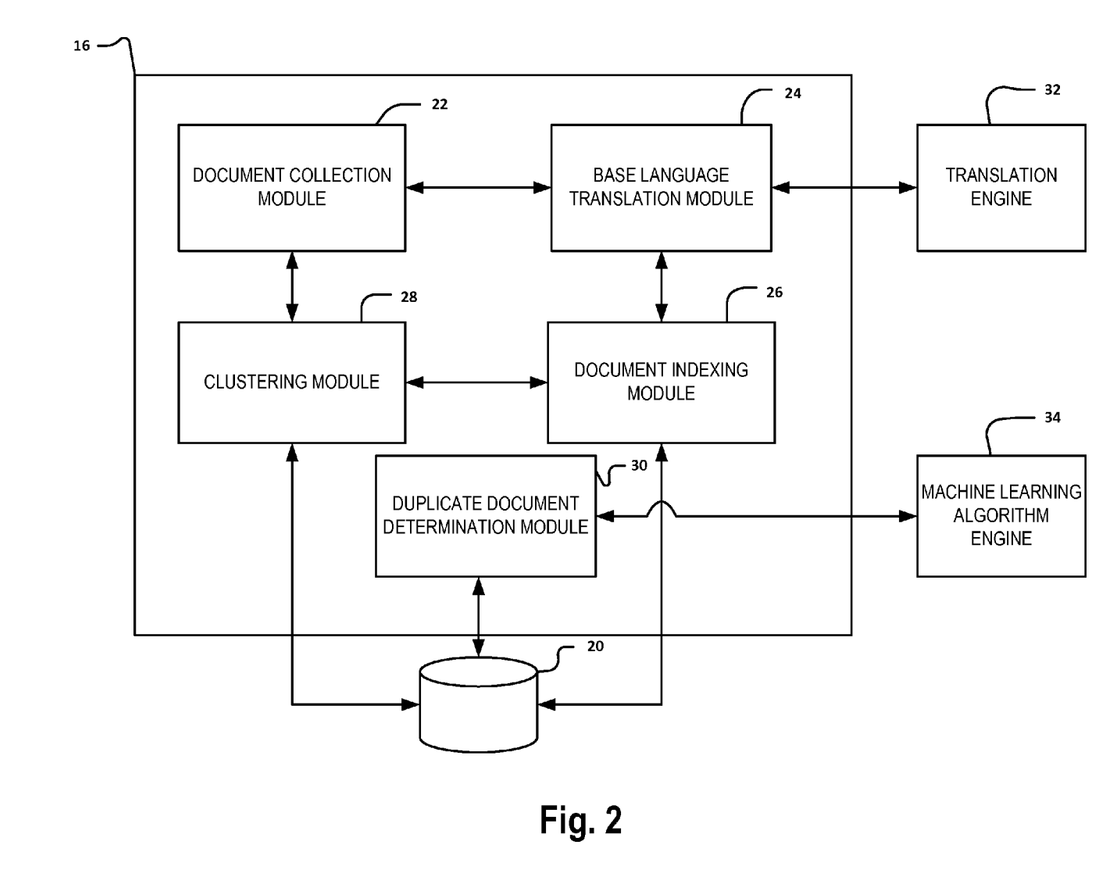
FIG. 2 is a functional block diagram of a first example computing device from FIG. 1.

With reference to FIG. 2, the first computing device 16 may include a document collection module 22, a base language translation module 24, a document indexing module 26, a clustering module 28 and a duplicate document determination module 30. The document collection module 22 is in communication with the network 14 and identifies a collection of documents to be clustered. The document collection module 22 may be in communication with and provide the documents to the base language translation module 24 and the clustering module 28. The collection of documents may include documents in different languages. Any number of different language documents may be included. The first computing device 16 provides a technique for clustering documents in different languages. The document indexing module 26, the clustering module 28 and the duplicate document determination module 30 may each be in communication with the database 20. The document indexing module 26 may also be in communication with the base language translation module 24 and the clustering module 28.

Figure 3:
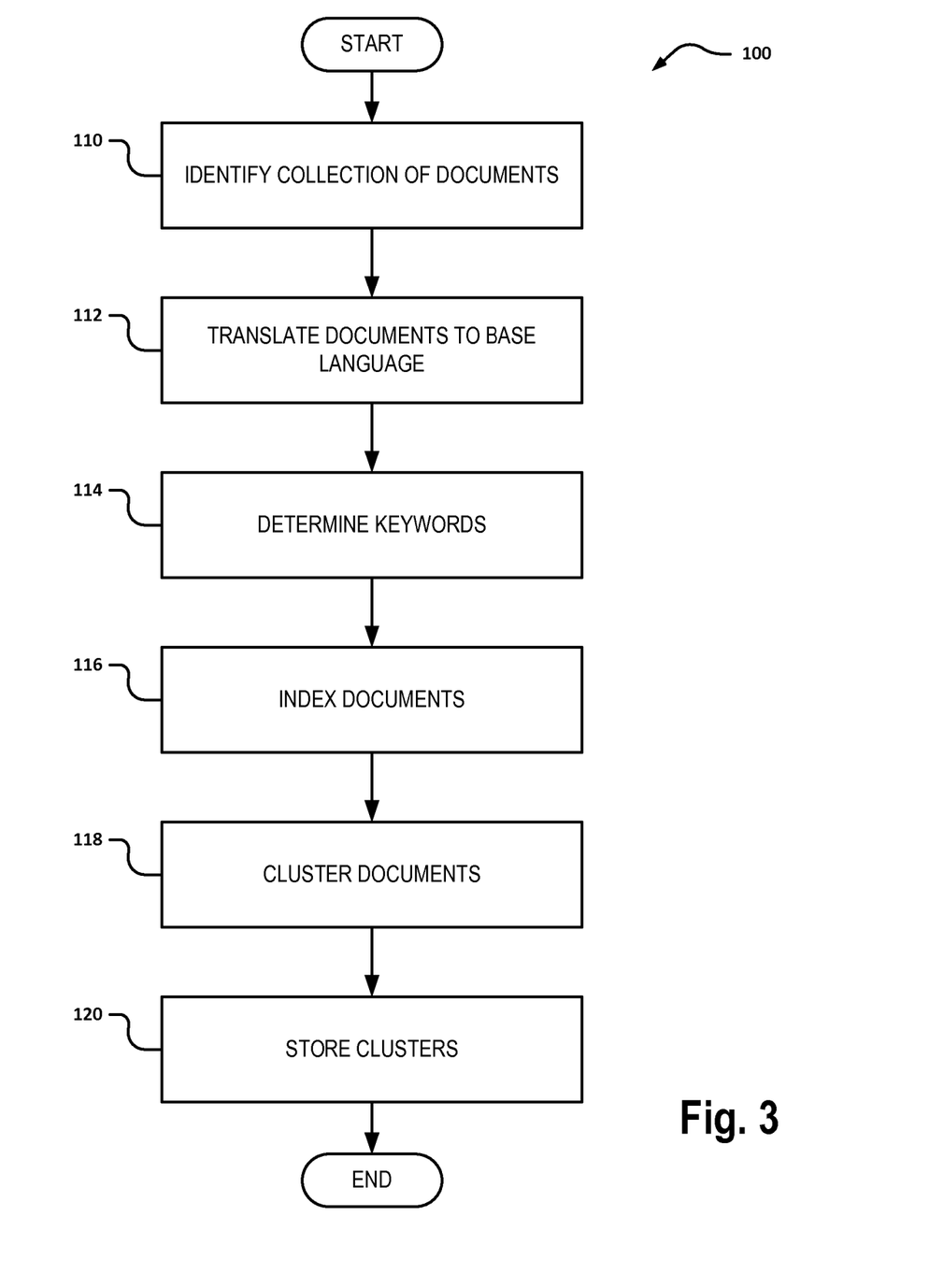
FIG. 3 is a flow diagram of an example document clustering technique according to the present disclosure.

An example clustering technique 100 is illustrated in the flow chart shown in FIG. 3. At 110, the collection of documents to be clustered is identified by the document collection module 22. The collection of documents includes documents in multiple languages. The collection of documents may include all or any subset of documents on the worldwide web. Alternatively, the collection of documents could include a set of documents in a closed system, such as a product database. After the documents are identified, the documents are translated into a common (base) language at 112.

The translation may include a machine translation of the foreign (non-base) language documents into the base language. The translation may be done locally by the base language translation module 24 or may be sent to a translation engine 32. The translations may be stored in the database 20. Keywords from the documents are determined at 114 by the document indexing module 26. Web crawling may be used on the translated and base language documents to generate the keyword listing. Insignificant terms, such as stop words "a", "an" and "the", may be omitted from consideration for keyword determination.

Figure 4:
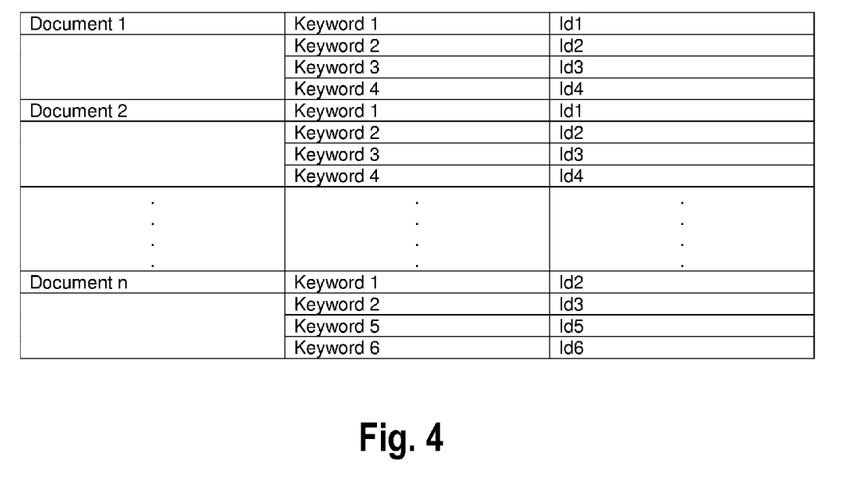
FIG. 4 is a schematic diagram of an example set of documents illustrating the clustering technique of FIG. 3.

The keywords are then indexed in a language-agnostic manner by the document indexing module 26 at 116. FIG. 4 provides a simplified representation of the document indexing. The document indexing may include assigning a numerical keyword identifier to each keyword in a document. For example purposes only, the base language may be English. "Document 1" in FIG. 4 may be an English translation of a German language document, "Document 2" may be a native English language document, and "Document n" may be an English translation of a Spanish language document. At 114, the techniques determine keywords (keywords 1, 2, 3, 4, 5 in the example) in the base language (English in the example) for the translated and base language documents.

At 116, the technique assigns a language-agnostic keyword index (Id1, Id2, Id3, Id4, Id5 in the example) to the keywords. The translated collection of documents may then be indexed by the keywords. The document indexing module 26 may store the language-agnostic keyword index for the documents in the database 20. As a result, the database 20 has a language-agnostic keyword index to the original collection of documents including both the base language documents and foreign language documents in their native languages. The translations of the foreign language documents may be deleted after the keyword indexing is completed. Therefore, the collection of documents may be in multiple languages (English, German and Spanish in the example) and may be indexed in a language-agnostic manner.

The clustering module 28 then clusters the documents by keyword index at 118. The clustering module 28 may operate on the documents in a variety of ways including any number of document clustering algorithms. By way of non-limiting example, the document clustering algorithms may include connectivity models, centroid models, distribution models, density models, subspace models or group models. A document may be grouped in one or more document clusters depending on the clustering technique used. The present disclosure is not limited to any specific clustering technique and can be applied using any of a variety of known clustering techniques.

Once the documents are separated into document clusters, the clustering module 28 may rank documents within each cluster by a distance function. The distance function may generate a distance between two documents corresponding to a level of similarity between the two documents. For example only, assume that "Documents 1, 2, . . . , n" in FIG. 4 are each within a cluster. In a simplified form, the distance between documents may be defined by the number of keywords that the documents have in common:

Distance (Document 1, Document 2)=4

Distance (Document 1, Document n)=2

Distance (Document 2, Document n)=2

The documents would then be ranked within the cluster in the order shown in FIG. 4 (Document 1, Document 2, Document n) since "Document 1" and "Document 2" have the most common keywords.

The example above is simplistic for purposes of illustration. It is understood that in practice the frequency of terms within the documents could be taken into consideration and could further be normalized relative to a total number of words in the document. The example for "Documents 1, 2, . . . n" illustrated above may be refined further by taking keyword location and metadata into consideration when assigning keyword indexing. After the document clusters are created and the documents are ranked within the document clusters, the document clusters are stored in the database 20 at 120.

The document clusters may also be used to estimate when a first document in a first language in a document cluster corresponds to a second document within the document cluster, but in a second language different from the first language. The duplicate document determination module 30 may be in communication with the clustering module 28 to estimate when the first and second documents are the "same" document in different languages. The duplicate document determination module 30 may apply the distance function described above to estimate when the first and second documents are the same document in different languages. For example, a predetermined threshold may be established to determine when the documents are the same document in different languages. In the example shown in FIG. 4 if the predetermined threshold was set to "4", then "Document 1" is estimated to be the German language equivalent of the English language "Document 2". The duplicate document determination module 30 may update the database 20 to indicate that the first and second documents are the same document in different languages.

The duplicate document determination module 30 may additionally be in communication with a machine learning algorithm engine 34. The duplicate document determination module 30 may provide document pairs estimated to be the "same" document in different languages as parallel text to the machine learning algorithm engine 34 for use in training the machine learning algorithm engine 34 for machine translation.

As indicated above, the technique 100 may be applied generally to the worldwide web or may be applied to closed systems. An example closed system application includes an e-commerce website. By way of non-limiting example, in the closed system application, the collection of documents identified by the document collection module 22 may include products from an e-commerce product database. The technique 100 described above may be applied to the e-commerce product database and clusters of related products in multiple languages may be created.

Figure 5:
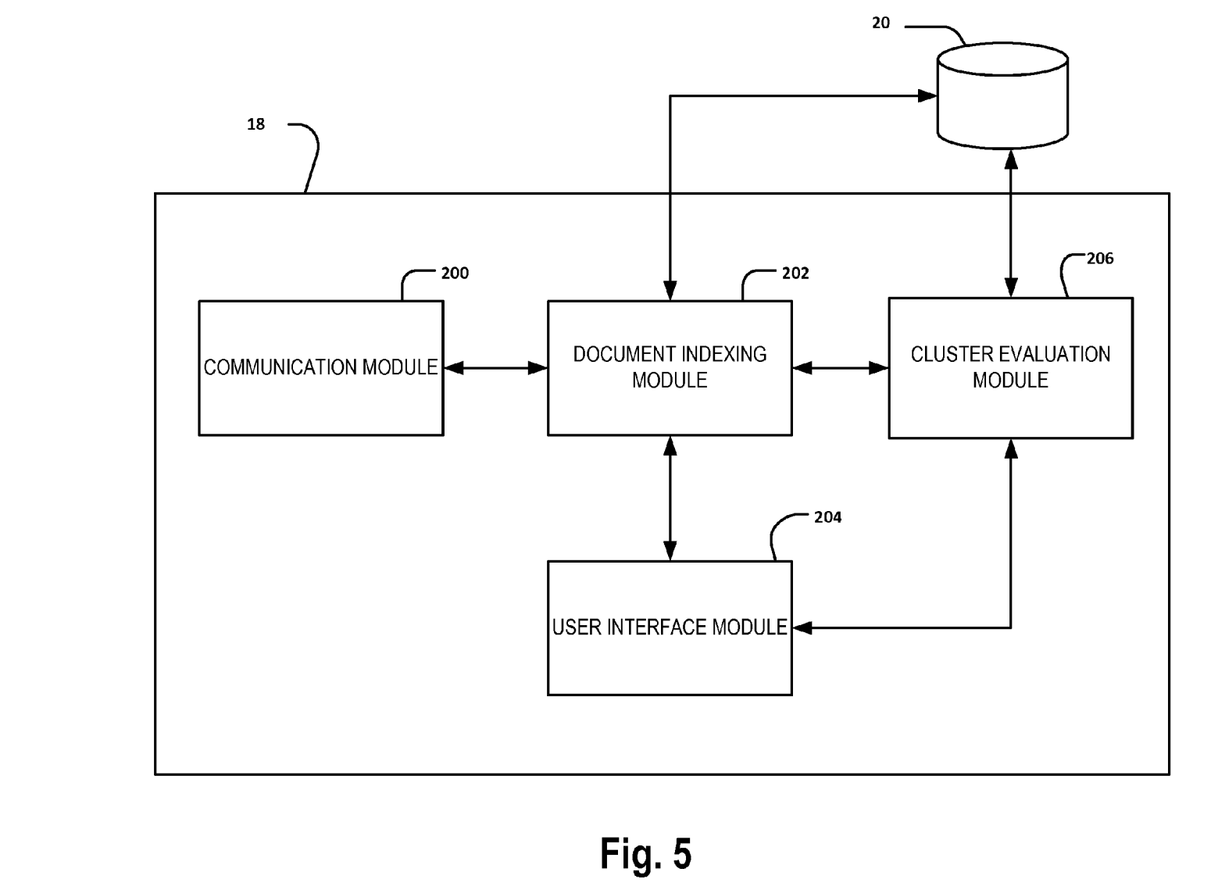
FIG. 5 is a functional block diagram of a second example computing device from FIG. 1.

As seen in FIG. 5, the second computing device 18 may include a communication module 200, a document identification module 202, a user interface module 204 and a cluster evaluation module 206. The communication module 200 may be in communication with the document identification module 202. The document identification module 202 may be in communication with the user interface module 204 and the cluster evaluation module 206.

Figure 6:
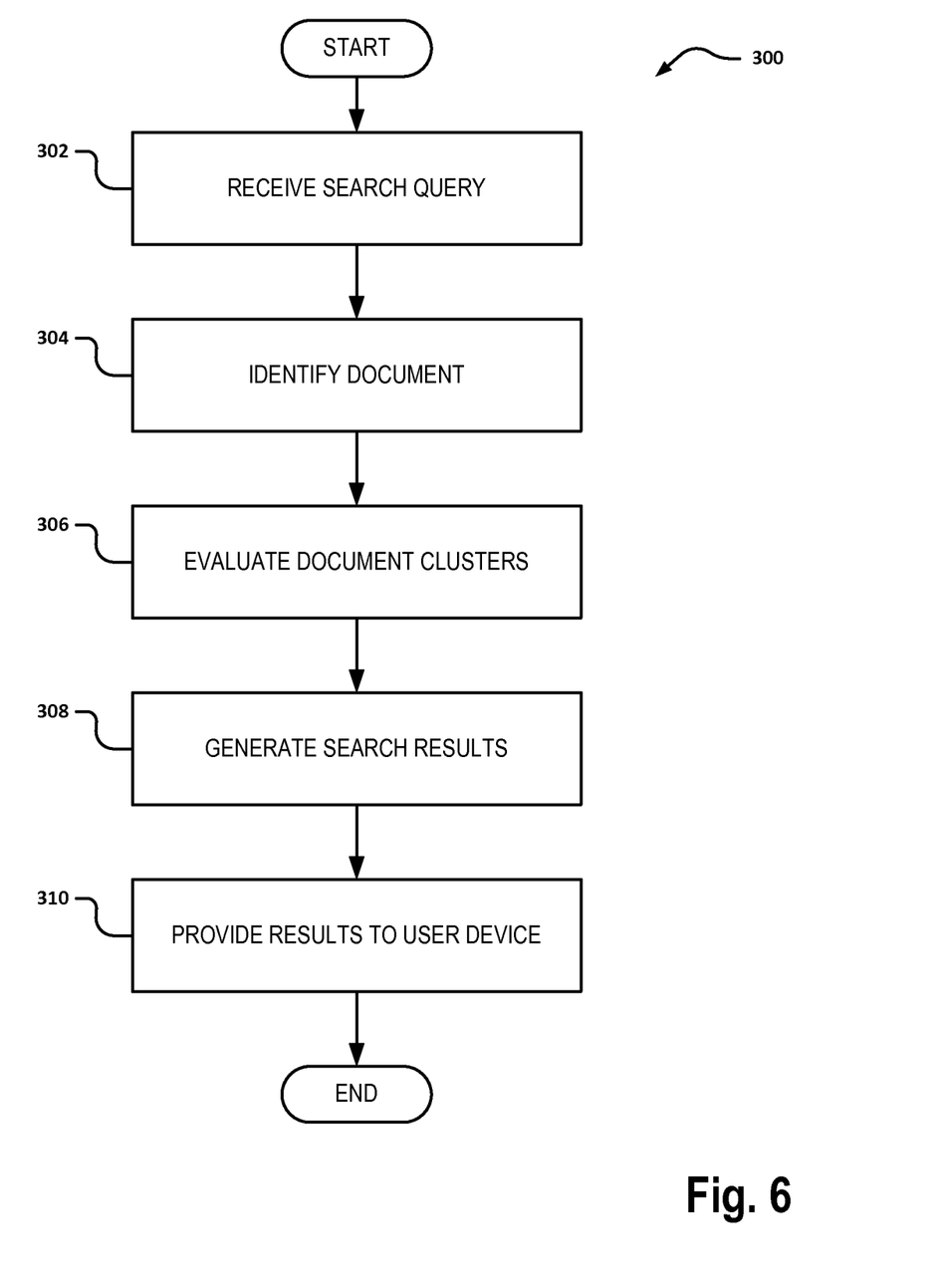
FIG. 6 is a flow diagram of an example technique according to the present disclosure.

An example technique 300 is illustrated in the flow chart shown in FIG. 6. The technique 300 provides expanded search results by locating a document from a user search query in a document cluster and including documents within a predetermined threshold of the document. The additional documents included in the search could be in any language different from the search language due to the use of multiple language document clusters.

The communication module 200 may be in communication with the user device 12 via the network 14 and receive a search query from the user device 12 at 302. The search query may be in a first language. At 304, the document identification module 202 identifies a first document in the first language related to the search query. The document identification module 202 then identifies a document cluster from the database 20 including the first document and identifies at least one document (a second document) in a second language different than the first language in the document cluster at 306. At 308, the user interface module 204 generates search results including documents in at least two languages including the first and second languages. The results may then be provided to the user device 12. The results may be provided in a variety of ways. In a first non-limiting example, the search results include a listing of results in the different languages. In a second non-limiting example, the search results include a listing of search results in the first language with an option for the user 10 to display additional references in one or more languages different than the first language.

When applied to document clusters related to the e-commerce product database discussed above, the technique 300 may provide products including foreign language descriptions from the document clusters for the product database. In the e-commerce application, at 302, the search query may include a user specified product. At 304, the user specified product in a document cluster is located and the product in the product database is identified. At 306, related products from the product database document cluster are determined. Recommended products for the user can be generated at 308, including products having descriptions or product information in languages different than the search language (first language). The recommended product listing is provided to the user device 12 at 310.

The technique 300 described above may also be applied to translation requests by the user 10. For example, when applied to translation requests, the communication module 200 receives a request for a translation webpage and a document translation request from the user 10. The document translation request includes a request for a translation of the document from a first language to a second language at 302. The document is identified by the document identification module 202 at 304. At 306, the document is located in a document cluster in the database 20 by the cluster evaluation module 206.

The cluster evaluation module 206 then determines if a second document in the document cluster in the second language is within a predetermined threshold from the first document. If the second document is within the predetermined threshold, then the first and second documents are determined to be translations of one another and the second document is provided to the user 10 as a response to the translation request. Additionally, if the second document includes metadata or some other indicator that provides information regarding the origin of the document, such as whether the second document is a human translation, the information may be provided to the user 10.

The first and second languages discussed above could be related to the base and foreign languages used to generate the document clusters in a variety of ways. Additionally, it is understood that any number of different languages could be included in the examples discussed above. In one example, the first language is the base language and the second language is one of the foreign languages. In a second example, the first language is one of the foreign languages and the second language is the base language. In a third example, the first language is one of the foreign languages and the second language is another one of the foreign languages different than the first language.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present disclosure.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:

receiving, at a communication module in a computing device, a request for a translation webpage from a user interacting with a user device in communication with the computing device;

receiving, at the communication module in the computing device, a search query from the user in a first language;

identifying, at a document identification module in the computing device, one or more documents related to the search query and at least one document cluster from a database in communication with the computing device, the one or more documents being from a collection of documents and including a first document requested for translation from the first language to a second language different from the first language by the user, the document cluster including the first document in the first language and one or more additional documents in the second language, wherein the document cluster is generated by:

(i) identifying, at a document collection module in the computing device, the collection of documents to be clustered, the collection of documents including foreign language documents and base language documents, (ii) translating, at a base language translation module in the computing device, the foreign language documents into the base language to obtain translated foreign language documents, (iii) determining, at a document indexing module in the computing device, keywords in the base language documents and keywords in the translated foreign language documents, (iv) clustering, at a clustering module in the computing device, the base language documents with the foreign language documents in a common set of document clusters based on the determined keywords in the base language documents and the determined keywords in the translated foreign language documents, the set of document clusters including both the base language documents and the foreign language documents, and (v) storing the set of document clusters in the database;

evaluating, at a cluster evaluation module in the computing device, the at least one document cluster to identify a second document from the one or more additional documents in the second language within a predetermined threshold from the first document, wherein a distance between the first and second documents corresponds to a level of similarity between the first and second documents;

selecting the second document from the at least one document cluster; and providing, from a user interface module in the computing device, the second document to the user device in response to the search query when the second document is within the predetermined threshold from the first document.

2. A computer-implemented method comprising:

receiving, at a communication module in a computing device, a search query in a first language from a user interacting with a user device in communication with the computing device;

identifying, at a document identification module in the computing device, one or more documents in the first language related to the search query and at least one document cluster from a database in communication with the computing device, the one or more documents being from a collection of documents, the document cluster being generated from the collection of documents and including the one or more documents in the first language and one or more additional documents in a second language different from the first language;

evaluating the at least one document cluster to identify a second document from the one or more additional documents in the second language within a predetermined threshold from the first document, wherein a distance between the first and second documents corresponds to a level of similarity between the first and second documents; and providing, from the computing device, a listing of search results to the user device in response to the search query, the listing of search results including documents only from the collection of documents and in at least two languages including the first and second languages, the listing of search results including the second document when the second document is within the predetermined threshold from the first document.

3. The computer-implemented method of claim 2, wherein the search query includes a request for a translation webpage from the user and the one or more documents includes a first document requested for translation from the first language to the second language by the user.

4. The computer-implemented method of claim 2, wherein the document cluster is generated by:

(i) identifying, at a document collection module in the computing device, a collection of documents to be clustered, the collection of documents including foreign language documents and base language documents, (ii) translating, at a base language translation module in the computing device, the foreign language documents into the base language to obtain translated foreign language documents, (iii) determining, at a document indexing module in the computing device, keywords in the base language documents and keywords in the translated foreign language documents, (iv) clustering, at a clustering module in the computing device, the base language documents with the foreign language documents in a common set of document clusters based on the determined keywords in the base language documents and the determined keywords in the translated foreign language documents, the set of document clusters including both the base language documents and the foreign language documents, and (v) storing the set of document clusters in the database.

5. The computer-implemented method of claim 4, wherein the first language is the base language used to generate the document clusters.

6. The computer-implemented method of claim 4, wherein the first language is a language corresponding to one of the foreign language documents.

7. The computer-implemented method of claim 2, wherein providing the listing of search results includes providing a list of results to the user device including documents in the first language and documents in at least the second language.

8. The computer-implemented method of claim 2, wherein providing the listing of search results includes providing a list of results to the user device including documents in the first language and providing an option for the user to view related foreign language documents including documents in at least the second language.

9. The computer-implemented method of claim 2, wherein the search query includes an identification of a first product on an e-commerce website, the one or more documents corresponding to the first product and the at least one document cluster including information for additional products related to the first product with the information being in a language different than the first language.

10. The computer-implemented method of claim 9, wherein providing the listing of search results includes providing a listing of the additional products to the user device in response to the search query.

* * * * *